United States Patent
Werner et al.

(10) Patent No.: US 8,646,567 B2
(45) Date of Patent: Feb. 11, 2014

(54) WORK VEHICLE OSCILLATION SYSTEM

(75) Inventors: Gregory K. Werner, Durango, IA (US); David F. Rindfleisch, Dubuque, IA (US); Francois Stander, Dubuque, IA (US); Joseph M. Montocchio, Dubuque, IA (US); David D. Latham, Dubuque, IA (US)

(73) Assignee: Deere & Company, Moline, IL (US)

( * ) Notice: Subject to any disclaimer, the term of this patent is extended or adjusted under 35 U.S.C. 154(b) by 135 days.

(21) Appl. No.: 13/029,234

(22) Filed: Feb. 17, 2011

(65) Prior Publication Data

US 2012/0211973 A1 Aug. 23, 2012

(51) Int. Cl.
*B62D 1/00* (2006.01)

(52) U.S. Cl.
USPC ............................. 180/418; 180/235; 280/492

(58) Field of Classification Search
USPC ............................. 180/235, 418, 265; 280/492
See application file for complete search history.

(56) References Cited

U.S. PATENT DOCUMENTS

| | | | |
|---|---|---|---|
| 2,342,407 A | 2/1944 | Letourneau | |
| 3,253,671 A * | 5/1966 | Fielding | 180/235 |
| 3,342,282 A * | 9/1967 | Forpahl | 180/235 |
| 3,773,129 A | 11/1973 | Anderson | |
| 3,831,693 A | 8/1974 | King | |
| 4,034,822 A * | 7/1977 | Stedman | 180/235 |
| 4,290,622 A * | 9/1981 | Horvath | 280/400 |
| 4,444,409 A * | 4/1984 | Garrison | 280/492 |
| 5,564,519 A | 10/1996 | Katoh et al. | |
| 2009/0324151 A1 * | 12/2009 | Craig et al. | 384/448 |

FOREIGN PATENT DOCUMENTS

| | | |
|---|---|---|
| FR | 2554394 A1 | 5/1985 |
| GB | 1427194 A | 3/1976 |

OTHER PUBLICATIONS

Background Information (2 pages).
Doosan Moxy Turning Ring Article (2008) (1 page).
Image of Astra Articulated Dump Truck Articulation Joint (1 page).
English Translation of Office Action in Counterpart Swedish Patent Application No. 1250051-8 (Sep. 10, 2012) (3 pages).
SKF Slewing Bearings Brochure (120 pages)(Sep. 2009).

* cited by examiner

*Primary Examiner* — Tony Winner

(57) ABSTRACT

A work vehicle comprises a front frame, a rear frame, an oscillation frame, a slew bearing, and a rolling-element bearing. The slew bearing and the rolling-element bearing allow oscillation between the oscillation frame and the rear frame about a fore-aft axis.

14 Claims, 4 Drawing Sheets

WORK VEHICLE OSCILLATION SYSTEM

FIELD OF THE DISCLOSURE

The present disclosure relates to oscillation about a fore-aft axis between the front and rear sections of a work vehicle, such as an articulated dump truck.

BACKGROUND OF THE DISCLOSURE

There are articulated dump trucks which have a front section and a rear section. The front section has the operator's station, and the rear section has a dump body for carrying a payload therein. The front and rear sections are articulated to one another. An oscillation system of the truck allows oscillation between the front and rear sections about a fore-aft axis of the truck to accommodate lateral terrain variations between the front and rear sections.

SUMMARY OF THE DISCLOSURE

According to an aspect of the present disclosure, there is provided a work vehicle. The work vehicle comprises a front frame, a rear frame, an oscillation frame, a slew bearing, and a rolling-element bearing. The oscillation frame is articulated to the front frame allowing relative pivotal movement between the front frame and the oscillation and rear frames about an articulation axis. The rolling-element bearing is rearward of the slew bearing relative to a fore-aft axis of the work vehicle. The slew bearing and the rolling-element bearing are coupled to the oscillation frame and the rear frame allowing oscillation between the oscillation frame and the rear frame about the fore-aft axis. The rolling-element bearing may improve the useful life of the slew bearing by unloading some of a moment on the slew bearing.

The above and other features will become apparent from the following description and the attached drawings.

BRIEF DESCRIPTION OF THE DRAWINGS

The detailed description of the drawing refers to the accompanying figures in which.

DETAILED DESCRIPTION OF THE DRAWINGS

Figure 1:
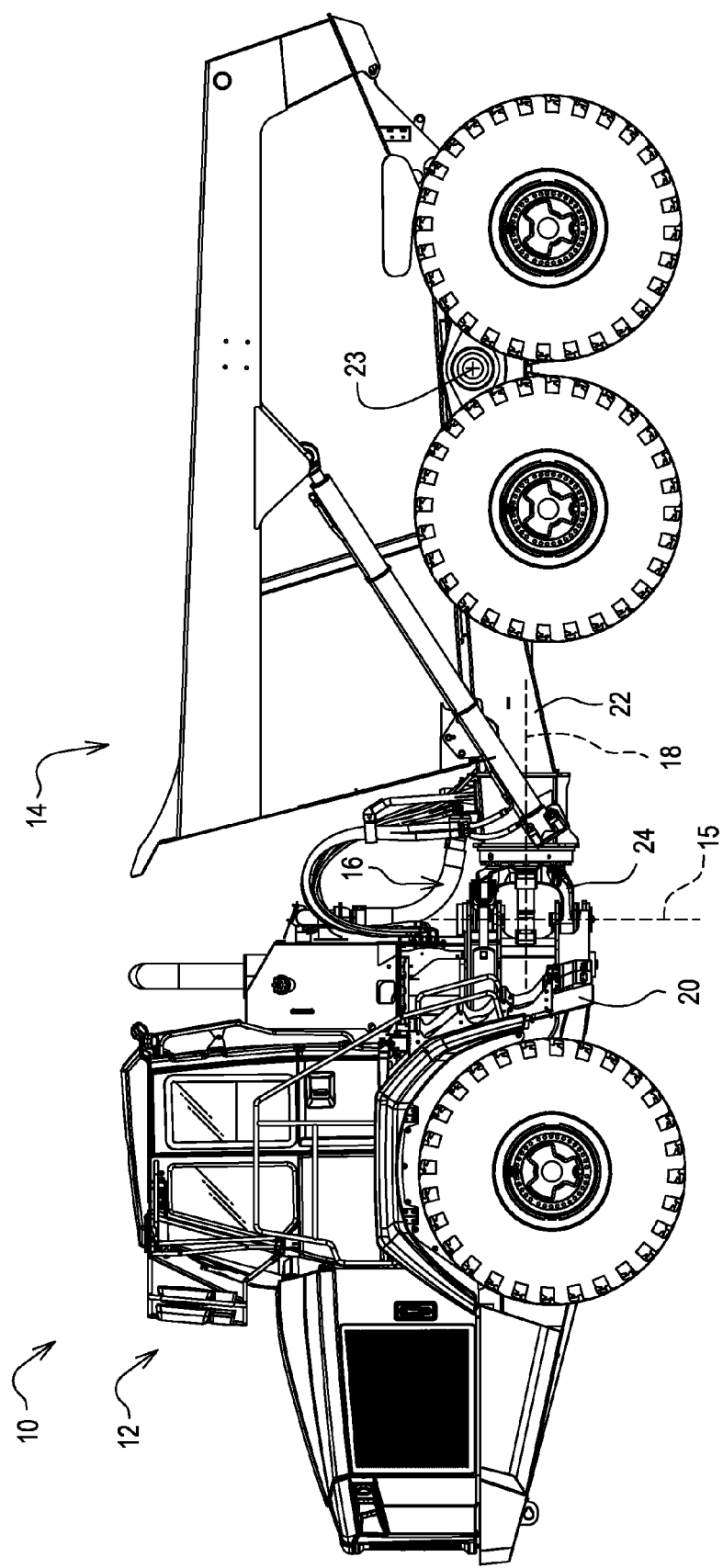
FIG. 1 is a simplified side elevation view of a work vehicle in the form of, for example, an articulate dump truck.

Referring to FIG. 1, there is shown a work vehicle 10 configured, for example, as an articulated dump truck. As such, the vehicle 10 may have a front section 12 and a rear section 14. The front and rear sections 12, 14 may be articulated to one another for relative pivotal movement therebetween about an articulation axis 15. The rear section 14 may have an oscillation system 16 allowing oscillation between the front and rear sections 12, 14 about a fore-aft or oscillation axis 18 of the vehicle 10 to accommodate lateral terrain variations between the front and rear sections 12, 14.

The front section 12 may be the power head of the vehicle 10 and may have a front frame 20. The operator's station and the engine may be included in the front section 12 and mounted to the front frame 20.

The rear section 14 may have a rear frame 22 and a dump body configured to carry material therein. The dump body may be pivoted to the rear frame 22. A lift cylinder on each side of the dump body may be coupled to the rear frame 22 and the dump body to tip the dump body to unload material from the dump body. The rear section 14 has two rear wheels on each side of the vehicle 10, the two wheels on each side coupled in tandem, the two tandems pivotable about a tandem axis 23.

Figure 2:
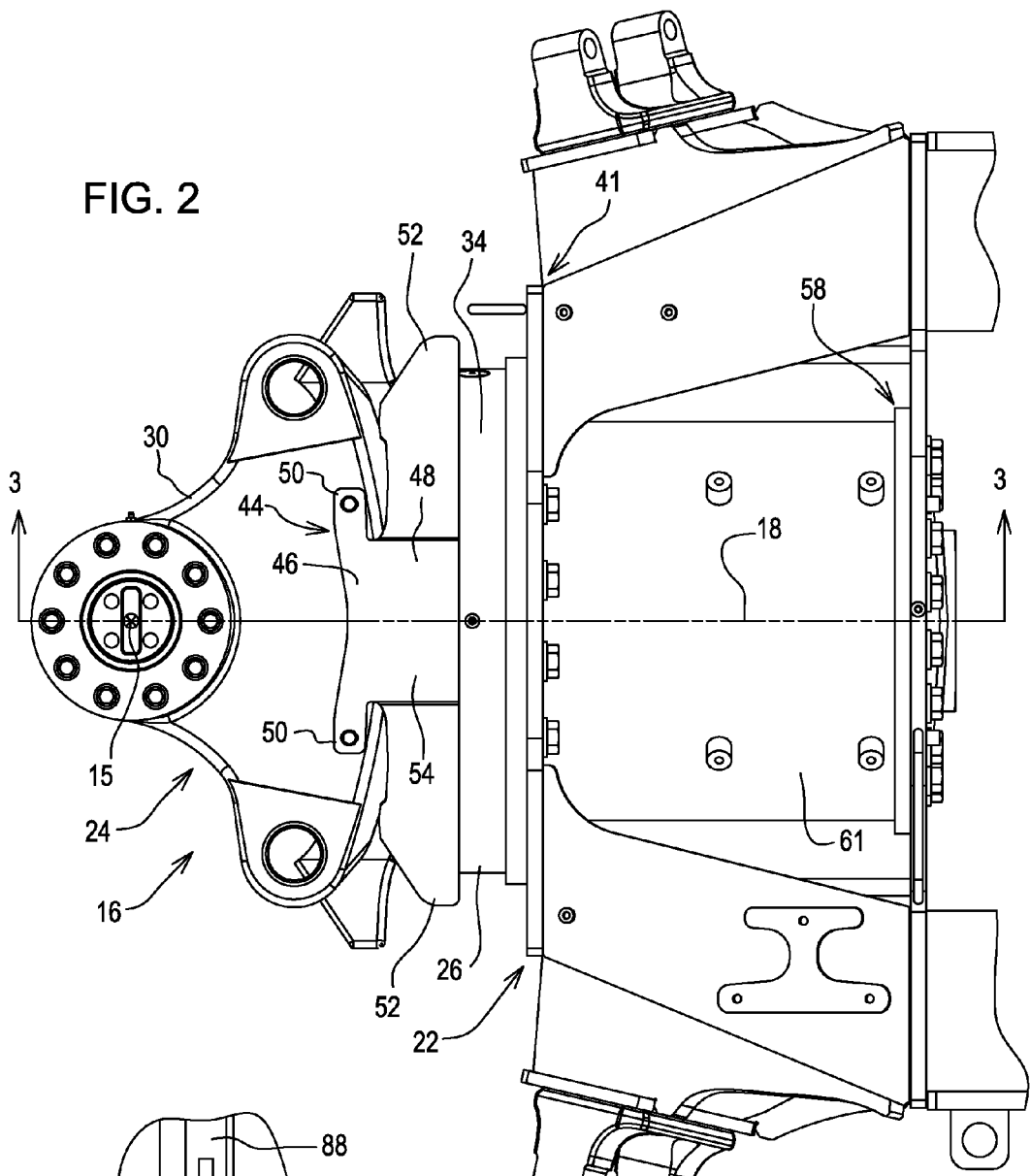
FIG. 2 is a top plan view showing an oscillation system of the work vehicle.
Figure 2A:
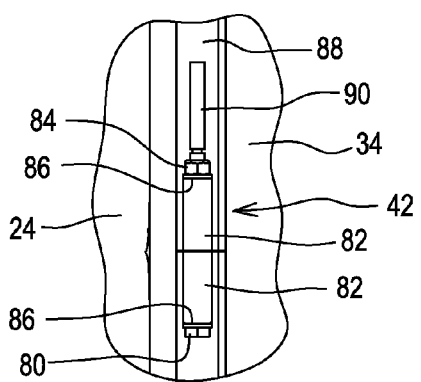
FIG. 2A is a top plan view showing a split-ring seal.
Figure 2B:
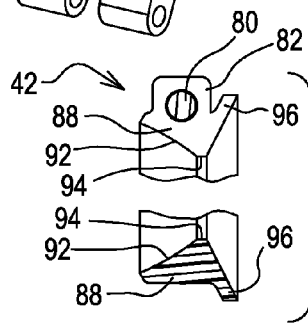
FIG. 2B is an enlarged sectional view of a seal shown in its relaxed state.
Figure 3:
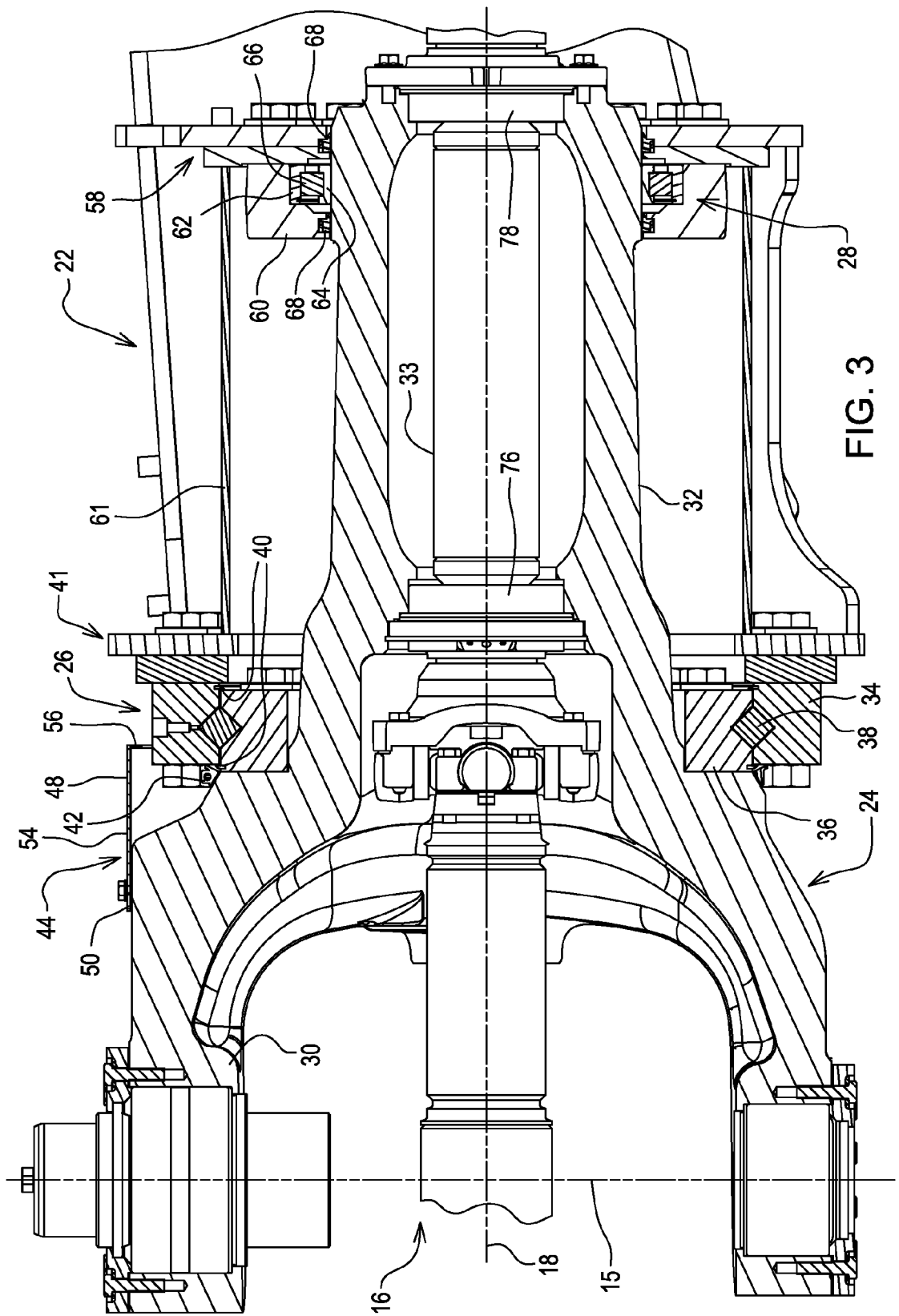
FIG. 3 is a sectional view taken along lines 3-3 of FIG. 2 showing the oscillation system of the work vehicle.

Referring to FIGS. 2 and 3, the oscillation system 16 may include an oscillation frame 24, a slew bearing 26, and a rolling-element bearing 28 spaced axially apart from the slew bearing 26 relative to the fore-aft axis 18. The oscillation frame 24 may be articulated to the front frame 20 allowing relative pivotal movement between the front frame 20 and the oscillation and rear frames 24, 22 about the articulation axis 15. The slew bearing 26 and the rolling-element bearing 28 may be coupled to the oscillation frame 24 and the rear frame 22 allowing oscillation between the oscillation frame 24 and the rear frame 22 about the fore-aft axis 18. The rolling-element bearing 26 may be rearward of the slew bearing 26 relative to the fore-aft axis 18 to unload some of the radial component of the moment on the slew bearing 26 to improve the useful life of the slew bearing 26.

The oscillation frame 24 has a front connector portion 30 and a rear tubular portion 32. The connector portion 30 and the front frame 20 are articulated to one another to provide an articulation joint for relative pivotal movement between the front and rear sections 12, 14 about the articulation axis 15. A driveline 33 extends through the interior of the tubular portion 32 and is mounted within the tubular portion 32 with a front bearing 76 and a rear bearing 78 (e.g., each a ball bearing) for relative rotation between the driveline 33 and the oscillation frame 24. The slew bearing 26 and the rolling-element bearing 28 surround the tubular portion 32 of the oscillation frame 24. The oscillation frame 24 may be constructed, for example, as a casting made, for example, of ductile iron.

The vehicle 10 has a left steering cylinder and a right steering cylinder, which are coupled to the front frame 20 and the connector portion 30 to cause such relative pivotal movement for steering of the vehicle 10. By putting the steering cylinders between the front frame 20 and the oscillation frame 24 instead of between the rear frame 22 and the oscillation frame 24, the hydraulic lines to the steering cylinders do not have to cross the articulation joint, avoiding potential damages to the lines in such a case.

The slew bearing 26 may have a radially outer race 34, a radially inner race 36, rollers 38 (e.g., right circular cylinder in shape), and a pair of annular seals 40. The outer race 34 may be fastened to a first cross wall 41 of a front cross structure of the rear frame 22 with fasteners (e.g., bolts with respective washers and nuts), the first cross wall having a main cross plate and an annular plate coupled (e.g., welded) to the main plate (the plates made, for example, of high strength low alloy steel). The inner race 36 may be fastened to the connector portion 30 of the oscillation frame 24 with fasteners (e.g., bolts with respective washers). The rollers 38 are positioned radially between the outer and inner races 34, 36 and joined by a cage. Rotation axes of adjacent rollers 40 may be angled cross-wise relative to one another at an exemplary angle of 45 degrees; as such, the slew bearing 26 may be a cross roller slew bearing.

The seals 40 may be positioned on opposite sides of the rollers 40 to inhibit ingress of relatively small debris into the bearing 26. One of the seals 40 may mate with an annular groove of the inner race 36 so as to be mounted thereto, and the other seal 40 may mate with an annular groove of the outer race 34 so as to be mounted thereto. The seals 40 may be made, for example, of polyurethane.

Referring to FIGS. 2A, 2B, 3, and 4, a split-ring seal 42 may contact the oscillation frame 24 and the slew bearing 26 so as to establish a sealed connection therebetween. The seal 42 may contact the oscillation frame 24, the inner race 36, and the outer race 34 so as to establish the sealed connection therebetween. The seal 42 acts as a first line of defense that inhibits ingress of relatively large debris from entering the bearing 26.

Opposite ends of the seal 42 may be fastened together with a fastener. As shown, for example, in FIG. 2a, the fastener may include a bolt 80 extending through a boss 82 of a first end of the seal 42 and a boss 82 of a second end of the seal 42, a nut 84 threaded onto the bolt 80, and two washers 86, one associated with the bolt head and the other associated with the nut 84. The fastener may be tightened by tightening of the nut 84 onto the bolt 80 (which may also be referred to as a cap screw).

The bolt 80 may have a (partially threaded) breakaway section 90 and may therefore be relatively long, providing a lead-in portion for receipt of the nut 84 onto the bolt 80. During installation of the seal 42, the nut 84 is advanced onto the breakaway section 90 and then onto the main threaded section of the bolt 80, stretching the seal 42. Once the seal 42 is installed, the breakaway section 90 may interfere with performance of the seal in that the breakaway section 90 may catch on nuts of the fasteners used to fasten the outer race 34 to the frame 22 and not allow free relative rotation between the seal 42 and the outer race 34 of the slew bearing 26. As such, after the fastener has been tightened, the breakaway section 90 may be broken off at a reduced-diameter frangible portion of the bolt 80, reducing the length of the bolt 80.

Tightening of the fastener may pressurize a ring 88 of the seal 42 onto the oscillation frame 24 against the slew bearing 26. As the ring 88 is pressurized, a first radially inner surface 92 of the ring 88 may slide radially inwardly against the oscillation frame 24 until the ring 88 nests at the interface between the oscillation frame 24 and the inner race 36 of the slew bearing 26 with the first radially inner surface 92 in contact with the oscillation frame 24, a second radially inner surface 94 in contact with a radially outer surface of the inner race 36 of the slew bearing 26, and a lip 96 of the ring 88 in contact with an axially forwardly facing surface of the outer race 34 of the slew bearing 26. In FIG. 3, the radially inner surfaces 92, 94 of the seal 42 are drawn relatively thick to indicate that they would be in contact with the oscillation frame 24 and the inner race 36, respectively. In actual use, the ring 88 would be positioned slightly radially inwardly and axially rearwardly from where shown to establish such contact and loading of the lip 96 against the outer race 34, and the seal 42 may be modified in size slightly to effect such contact.

Referring to FIGS. 2 and 3, a guard 44 may extend over the slew bearing 26 to deflect debris (e.g., debris that may fall from the dump body) from the seal 42 which could otherwise grind against the seal 42 during oscillation. The guard 44 may be mounted to the oscillation frame 24. The guard 44 may have a connector portion 46 and a deflector portion 48. The connector portion 46 may have two tabs 50 extending in laterally opposite directions relative to the fore-aft axis 18. Each tab 50 may be fastened to the connector portion 30 of the oscillation frame 24 with a fastener including a bolt and washers, the bolt extending through a washer above the tab 50, the tab 50, and a number of washers (e.g., three) positioned between the tab 50 and the connector portion 30 of the oscillation frame 24 and acting as shims. The deflector portion 48 may have two deflector wings 52 extending in laterally opposite directions relative to the fore-aft axis 18 over the slew bearing 26.

The guard 44 may have a top plate 52 and a rear plate 54 coupled (e.g., welded) to a rear edge of the top plate 52 (the plates 52, 54 made, for example, of high strength low alloy steel). The top plate 52 may provide the tabs 50 and a top portion of the wings 52, and the rear plate 56 may provide a rear portion of the wings 52.

The front cross-structure may have a second cross wall 58 and a bearing housing 60. The second cross wall 58 may be rearward of the first cross wall 41, and may have a main cross plate and an annular plate coupled (e.g., welded) to that main plate (the plates made, for example, of high strength low alloy steel). The bearing housing 60, made, for example, of gray iron, may be fastened to the second cross wall 58 with fasteners in the form of, for example, bolts and washers, each bolt extending through a respective washer and the main and annular plates of the second cross wall 58 into the bearing housing 60.

A protective tube 61 may surround the tubular portion 32 of the oscillation housing 24 to keep dirt and water out of the oscillation system and provide strength for the rear frame 22. The protective tube 61 may be coupled (e.g., welded) to the main plate of the first cross wall 41 and the annular plate of the second cross wall 58. To form the protective tube 61, a rectangular plate (made, for example, of high strength low alloy steel) may be rolled into a tubular shape and the ends of the plate may be chamfered to provide a weld groove that receives a weld.

The rolling-element bearing 28 is positioned radially between the bearing housing 60 and the tubular portion 32 of the oscillation housing 24 relative to the fore-aft axis 18. The rolling-element bearing 28 may have a radially outer race 62, a radially inner race 64, rolling elements 66, and a pair of annular seals 68. The outer race 62 may be pressed into the bearing housing 60. The inner race 64 may be lightly pressed onto the tubular portion 32 of the oscillation housing 24. The rolling elements 66 may be positioned radially between the outer and inner races 62, 64. The rolling elements 66 may be rollers, and, as such, the bearing 28 may be a roller bearing, such roller bearing avoiding shimming.

The first and second seals 68 may be positioned on axially opposite sides of the rolling-element bearing 28 relative to the fore-aft axis 18 to inhibit ingress of debris into the bearing 28. Each of the first and second seals 68 may contact the tubular portion 32 of the oscillation frame 24 and the rear frame 22 so as to establish a sealed connection therebetween. Each seal 68 is positioned on the tubular portion 32. The forward first seal 68 mates with a groove in the bearing housing 60 so as to be mounted thereto, and the rearward second seal 68 mates with a groove defined between the annular plate of the second cross wall 58 and the main plate of the second cross wall 58 so as to be mounted to that groove. Each seal 68 may include a sealing element (made, for example, of polyurethane) and an O-ring (made, for example, of rubber), the sealing element having a lip against the tubular portion 32 of the oscillation frame 24, the O-ring spring-loading the sealing element since the inside diameter of the sealing element is relatively large. For ease of illustration, each seal 68 (i.e., the sealing element and the O-ring) is shown in its relaxed (undeflected) condition, although one of ordinary skill in the art would recognize that it would be deflected in use.

Figure 4:
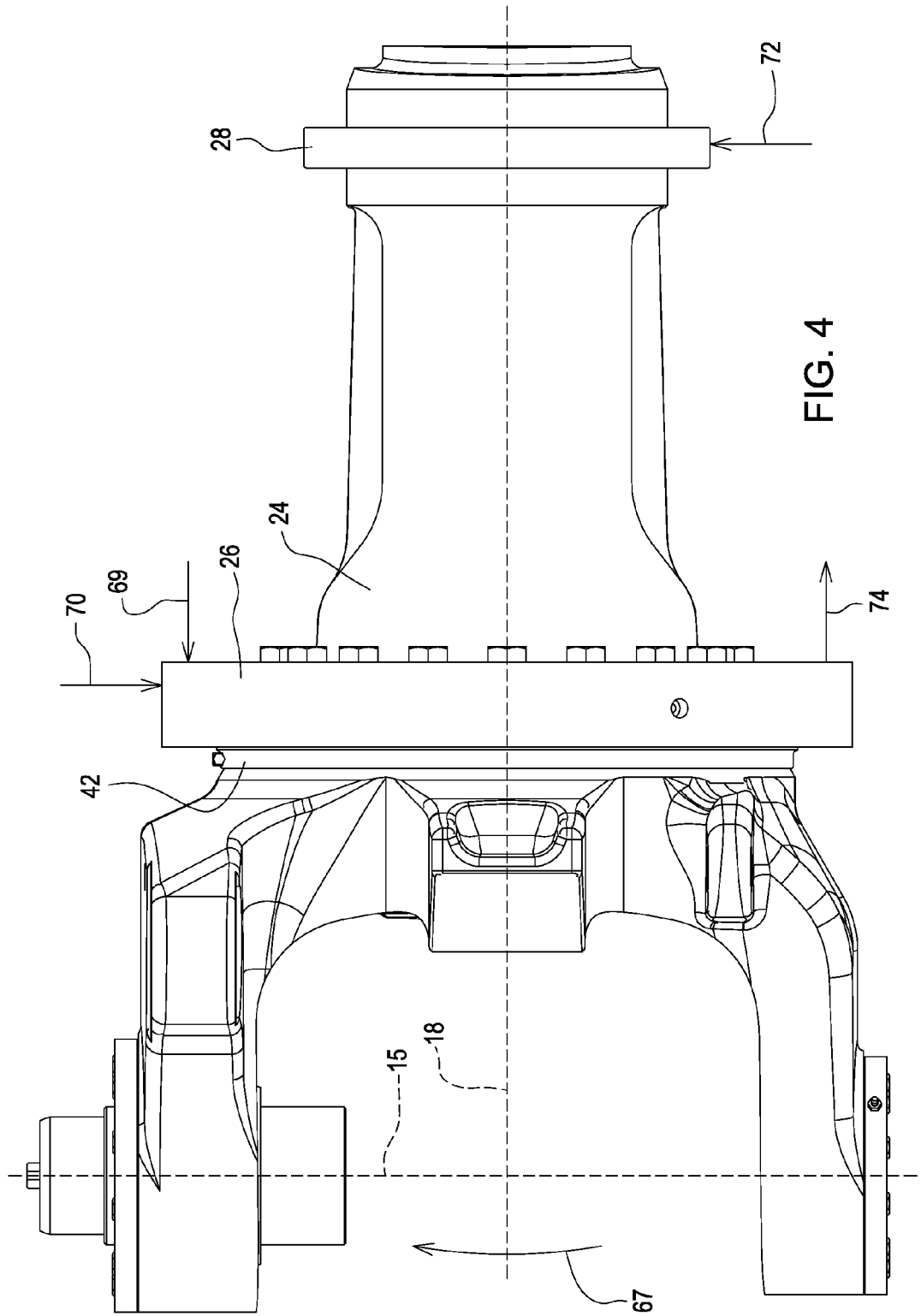
FIG. 4 is a sectional view showing a slew bearing and a rolling-element bearing on an oscillation frame.

Referring to FIG. 4, the rolling-element bearing 28 may improve the useful life of the slew bearing 26 by unloading some of a moment on the slew bearing 26. The center of gravity of the rear section 14 is forward of the tandem axis 23, tending to tip the rear section 14 forward. The articulation joint counteracts this tendency, applying a moment 67 to the oscillation frame 24 about the intersection of the fore-aft axis 18 and the articulation axis 15. This moment is taken up by the slew bearing 26 and the rolling-element bearing 28, with axial and radial forces 69, 70 on the upper portion of the slew bearing 26, an axial force 72 on the lower portion of the slew bearing 26, and a radial force 74 on the rolling-element bearing 28. The rolling-element bearing 28 thus unloads some of the moment 67 on the slew bearing 26.

For ease of illustration, no welds and threads have been shown, but are to be understood.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A work vehicle, comprising:
    a front frame,
    a rear frame,
    an oscillation frame articulated to the front frame allowing relative pivotal movement between the front frame and the oscillation and rear frames about an articulation axis,
    a slew bearing,
    a rolling-element bearing rearward of the slew bearing relative to a fore-aft axis of the work vehicle, wherein the slew bearing and the rolling-element bearing are coupled to the oscillation frame and the rear frame allowing oscillation between the oscillation frame and the rear frame about the fore-aft axis, and the slew bearing and the rolling-element bearing surround the oscillation frame.

2. The work vehicle of claim 1, wherein the slew bearing is a cross roller slew bearing.

3. The work vehicle of claim 1, wherein the rolling-element bearing is a roller bearing.

4. The work vehicle of claim 1, wherein the slew bearing is rearward of the articulation axis relative to the fore-aft axis of the work vehicle, and the slew bearing and the rolling-element bearing are coupled to the oscillation frame and the rear frame therebetween.

5. The work vehicle of claim 1, wherein the rolling-element bearing is spaced axially apart from the slew bearing relative to the fore-aft axis.

6. The work vehicle of claim 1, further comprising a steering cylinder coupled to the front frame and the oscillation frame.

7. The work vehicle of claim 1, comprising a first seal and a second seal, wherein the first and second seals are positioned on axially opposite sides of the rolling-element bearing relative to the fore-aft axis, the first seal is positioned axially between the rolling-element bearing and the slew bearing relative to the fore-aft axis, and each of the first and second seals contacts the oscillation frame and the rear frame.

8. A work vehicle, comprising:
    a front frame,
    a rear frame,
    an oscillation frame articulated to the front frame allowing relative pivotal movement between the front frame and the oscillation and rear frames about an articulation axis,
    a slew bearing,
    a rolling-element bearing rearward of the slew bearing relative to a fore-aft axis of the work vehicle, wherein the slew bearing and the rolling-element bearing are coupled to the oscillation frame and the rear frame allowing oscillation between the oscillation frame and the rear frame about the fore-aft axis, and
    a seal contacting the oscillation frame and the slew bearing.

9. The work vehicle of claim 8, wherein the slew bearing comprises an outer race and an inner race, and the seal contacts the oscillation frame and the outer race.

10. A work vehicle, comprising:
    a front frame,
    a rear frame,
    an oscillation frame articulated to the front frame allowing relative pivotal movement between the front frame and the oscillation and rear frames about an articulation axis,
    a slew bearing,
    a rolling-element bearing rearward of the slew bearing relative to a fore-aft axis of the work vehicle, wherein the slew bearing and the rolling-element bearing are coupled to the oscillation frame and the rear frame allowing oscillation between the oscillation frame and the rear frame about the fore-aft axis, and
    a guard extending over the slew bearing.

11. The work vehicle of claim 10, wherein the guard is mounted to the oscillation frame.

12. The work vehicle of claim 10, wherein the guard comprises two deflector wings extending in laterally opposite directions relative to the fore-aft axis.

13. The work vehicle of claim 10, comprising a seal contacting the oscillation frame and the slew bearing, wherein the guard is positioned radially over the seal relative to the fore-aft axis.

14. The work vehicle of claim 13, wherein the guard comprises two deflector wings sloping downwardly in laterally opposite directions relative to the fore-aft axis and radially over the seal relative to the fore-aft axis to deflect debris away from the seal.

* * * * *